United States Patent
Hunter et al.

[11] Patent Number: 5,980,206
[45] Date of Patent: Nov. 9, 1999

[54] MONOLITHIC STRUCTURE HAVING IMPROVED FLAW TOLERANCE

[75] Inventors: David H. Hunter, Cheshire, Conn.; Douglas E. Tritsch, Beavercreek, Ohio

[73] Assignee: Sikorsky Aircraft Corporation, Stratford, Conn.

[21] Appl. No.: 08/657,836

[22] Filed: May 31, 1996

[51] Int. Cl.$^6$ .................................................. B64C 11/12
[52] U.S. Cl. ...................... 416/134 A; 416/141
[58] Field of Search .......................... 416/134 A, 134 R, 416/131, 133, 141

[56] References Cited

U.S. PATENT DOCUMENTS

| | | |
|---|---|---|
| 3,967,918 | 7/1976 | Mouille et al. .................. 416/134 A |
| 3,977,274 | 8/1976 | Ditlinger ........................ 416/134 A |
| 3,995,081 | 11/1976 | Fant et al. ........................ 428/119 |
| 4,195,967 | 4/1980 | Weiland ........................ 416/134 A |
| 4,264,277 | 4/1981 | McCafferty .................... 416/134 A |
| 4,352,631 | 10/1982 | Buchs et al. ................... 416/134 A |
| 4,427,340 | 1/1984 | Metzger et al. ..................... 416/141 |
| 4,585,393 | 4/1986 | Hibyan et al. .................. 416/134 A |
| 4,650,401 | 3/1987 | Yao et al. ...................... 416/134 A |
| 4,746,272 | 5/1988 | Noehren et al. ................ 416/134 A |
| 5,067,875 | 11/1991 | Hunter et al. .................. 416/134 A |
| 5,129,971 | 7/1992 | Henry ........................... 148/428 |
| 5,171,380 | 12/1992 | Henry ........................... 148/428 |
| 5,228,834 | 7/1993 | Yamamoto et al. ............. 416/134 A |

Primary Examiner—John T. Kwon
Attorney, Agent, or Firm—Brian A. Collins

[57] ABSTRACT

A monolithic structural member (10) operative for reacting steady and vibratory bending moment loads M about an applied loads axis X and having a specially configured cross-sectional configuration for providing improved flaw tolerance. The cross-sectional configuration (10) includes a central connecting element (18) and at least one pair of structural ribs (14a, 14b) being integrally formed with the central connecting element (18) and projecting outwardly thereof. The structural ribs (14a, 14b) are, furthermore disposed in the tensile field produced by the steady portion of the bending moment loads M and are proximal to the centroid $C_T$ of the cross-section (10). The cross-sectional configuration (10) defined by the structural ribs and connecting element produces a partial inertia ratio $I_X/I_Y$ greater than or equal to 1.0, which partial inertia ratio $I_X/I_Y$ has the advantageous effect of retarding or arresting crack propagation in the structural member (10). The cross-sectional configuration (10), as adapted for use in a helicopter rotor hub assembly (50), provides improved flaw tolerance and improved clearance between rotor hub assembly components. Specifically, the cross-sectional configuration (10) has a double-tee cross-sectional shape and is employed in areas corresponding to the midsection (64m) of each rotor assembly yoke (64) and shear segments (62) of the hub retention member (52). The double-tee cross-sectional configuration (10) facilitates higher flapwise and edgewise angular excursions between the yoke (64) and hub retention member (52) thus providing greater design flexibility and/or reducing the size and weight of the rotor hub assembly (50).

23 Claims, 6 Drawing Sheets

MONOLITHIC STRUCTURE HAVING IMPROVED FLAW TOLERANCE

TECHNICAL FIELD

This invention is directed to structural members operative for reacting vibratory bending loads and, more particularly, to monolithic structures having improved structural properties for providing improved flaw tolerance.

BACKGROUND OF THE INVENTION

In the field of structures design, there is a constant search in the art for structures and materials which exhibit the properties of unlimited life and/or are structurally redundant for applications where fail-safe operation is desirable. For example, in the aerospace industry, it is essential that certain flight-safety-critical mechanical systems such as the main rotor hub assembly of rotorcraft operate continuously even in the presence of a structural flaw or failure. Accordingly, it is common practice for designers of such mechanical systems to employ structural members having the requisite mass and/or material composition for reacting the full spectrum of imposed loads or, alternatively, utilize multi-element construction for providing redundant load paths in the event of a single element failure.

Structural members of metallic composition offer ease of manufacturing by means of machining, casting or forging, however, such metallic structures typically exhibit poor flaw tolerance. As used herein, flaw tolerance is the ability of a structure to resist fatigue crack propagation, and, more importantly, to resist such propagation to the point of ultimate failure. To compensate for this material characteristic, the designer must ensure that adequate structure, i.e., material mass, is present to maintain normal and shear stresses at a level which prevents the formation or rapid growth of cracks in the structural member. It will be appreciated that design methodologies which increase the mass of the structure to effect fail-safe operation are structurally inefficient. Moreover, in a weight critical aircraft application, such structural inefficiency adversely impacts the fuel and flight performance of the aircraft.

Advances in material composition, such as those in the area of fiber-reinforced resin matrix materials, have provided more acceptable solutions to the requirement for fail-safety. Firstly, the reinforcing fibers therein inherently provide multiple load paths inasmuch as the structural fibers may be viewed as individual elements which, depending upon the fiber loading or content, are capable of redundantly reacting the imposed loads. Secondly, the failure mode of such composite materials is characterized by a delamination or matrix failure rather than a failure across the structural fibers. That is, cracks propagate in the binding matrix and do not significantly alter the structural integrity of the composite structure. Lastly, such composite structures offer superior strength to weight properties, hence are particularly advantageous for aircraft applications. Hibyan et al U.S. Pat. No. 4,585,393 discloses a light-weight, damage tolerant, yoke assembly for helicopter rotor hubs wherein a combination of unidirectionally oriented composite fibers, e.g., graphite and fiberglass, provides the desired fail-safety.

While composite materials offer these and other structural advantages, the complex geometry of many structural members, i.e., I-Beams, T-Beams and X-beams, is, oftentimes, fiscally unsuitable for composite manufacture, and, in particular, automated composite manufacture. Yao et al U.S. Pat. No. 4,650,401 describes a composite cruciform having a generally X-shaped cross-section wherein the cruciform functions to structurally interconnect a helicopter rotor blade assembly to a central torque driving hub member. It will be appreciated that manufacturing difficulties arise when attempting to arrange the fibers in the proper orientation to accommodate the various load paths through the rib sections of the cruciform. Accordingly, resort is made to laborious hand lay-up of composite material fibers to achieve the desired fiber orientation. Alternatively, simple rectangular shaped cross-sections such as employed in Hibyan et al, are employed to facilitate manufacturing while maintaining the desired fiber orientation.

While multi-element construction can simplify manufacturing by utilizing simple cross-sectional shapes, in combination to achieve the desired structural redundancy, such construction often requires increased spatial requirements and intricate assembly. McCafferty U.S. Pat. No. 4,264,277, describes an arrangement for redundantly mounting a helicopter rotor blade assembly to a hub member wherein a secondary spindle or tie bar is disposed internally of a primary arm for reacting rotor blade loads in the event of a primary arm failure. While the mounting arrangement disclosed therein provides separate load paths, it will be appreciated that such arrangement requires a large design envelop and involves intricate assembly.

A need therefore exists for providing a structural member which is structurally efficient, non-complex, and facilitates manufacture while having the desired flaw tolerance for fail-safe operation.

SUMMARY OF THE INVENTION

It is an object of the present invention to provide a monolithic structural member having a non-complex, structurally efficient cross-sectional shape which retards fatigue crack propagation.

It is yet another object of the invention to provide such a monolithic structural member which is fabricated from homogeneous materials for facilitating manufacture thereof.

It is yet a further object of the present invention to provide such a monolithic structural member for use in a helicopter rotor hub assembly wherein critical components thereof exhibit the properties of unlimited life.

It is yet another object of the present invention to provide such a monolithic structural member for use in a helicopter rotor hub assembly wherein the geometric shape of the monolithic structure provides improved clearance between adjacent rotor hub assembly components.

These and other objects are achieved by a structural member operative for reacting steady and vibratory bending moment loads about an applied loads axis, wherein the structural member is characterized by a monolithic structure having a specially configured cross-sectional configuration. The cross-sectional configuration includes a central connecting element and at least one pair of structural ribs being integrally formed with the central connecting element and projecting outwardly thereof. The structural ribs are, furthermore, disposed in the tensile field produced by the steady portion of the bending moment loads and are proximal to the centroid of the cross-section. The cross-sectional configuration defined by the structural ribs and connecting element produces an inertia ratio $I_X/I_Y$ greater than or equal to 1.0, which inertia ratio has the advantageous effect of retarding or arresting crack propagation in the structural member.

The cross-sectional configuration, as adapted for use in a helicopter rotor hub assembly, provides improved flaw tolerance and improved clearance between rotor hub assembly components. More specifically, the cross-sectional configuration has a double-tee cross-sectional shape and is employed in areas corresponding to the midsection of each rotor assembly yoke and shear segment of the hub retention member. The double-tee cross-sectional shape, and, more specifically, the closely-spaced structural ribs facilitates higher flapwise and edgewise angular excursions between the yoke and hub retention member thus providing greater design flexibility and/or reducing the size and weight of the rotor hub assembly.

BRIEF DESCRIPTION OF THE DRAWINGS

A more complete understanding of the present invention and the attendant features and advantages thereof may be had by reference to the following detailed description of the invention when considered in conjunction with the following drawings wherein:

FIG. 1b depicts a characteristic cross-sectional view taken along line 1b—1b of FIG. 1a.;

BEST MODE FOR CARRYING OUT THE INVENTION

Figure 1A:
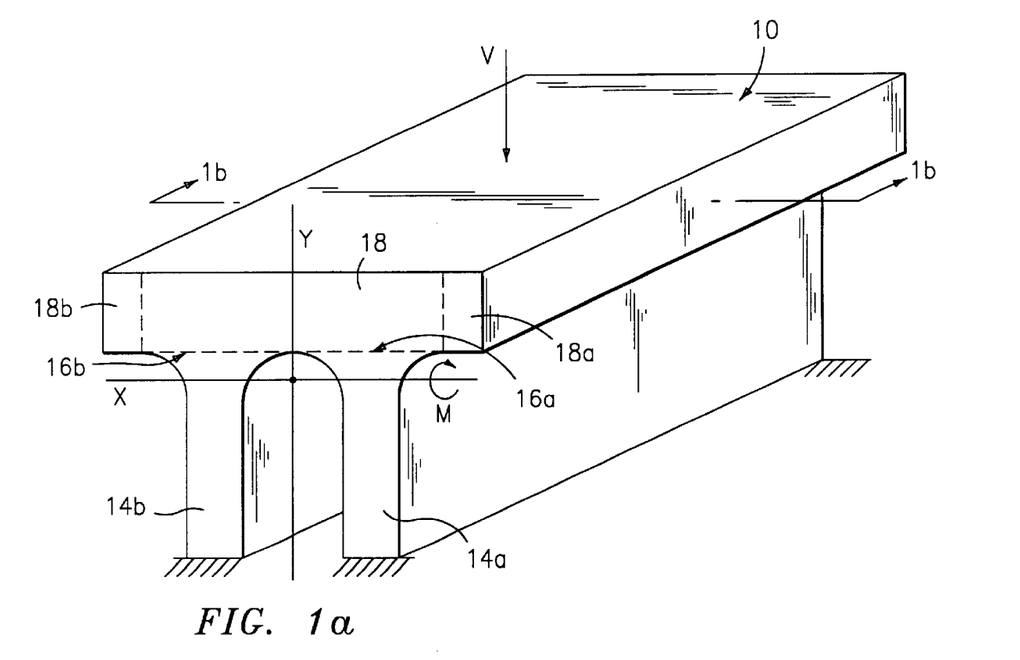
FIG. 1a depicts a perspective view of a monolithic structural member according to the present invention and the representative loads that are applied to such monolithic structural member.
Figure 1B:
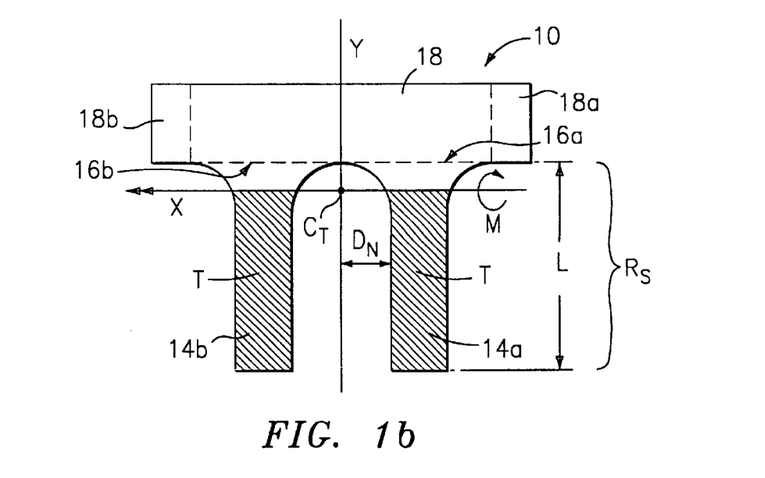

Referring now to the drawings wherein like reference characters identify corresponding or similar elements throughout the several views, FIGS. 1a and 1b depict an exemplary embodiment of a monolithic structural member 10 according to the present invention. In the context used herein, the term "monolithic" describes a structure which reacts/transfers imposed loads by means of a single load path. The cross-sectional configuration of the monolithic structural member 10 is specially adapted to provide structural properties which retard or arrest the propagation of a flaw or crack. More specifically, the monolithic structural member is configured in cross-sectional shape such that the principle bending axis thereof is favorably positioned with respect to a flaw or crack, thereby causing the flaw or fatigue crack to propagate into regions of reducing stress intensity. The general design methodology for effecting such structural properties will be discussed in subsequent paragraphs, however, to impart an understanding of the underlying principles, the invention will be presented in the context of a specially adapted double-tee cross-sectional configuration having critically spaced structural ribs.

The structural characteristics and functional advantages of the monolithic structural member 10 will be described in terms of the applied loads, the moments of inertia of the cross-sectional configuration, and the orientation of the principle axes thereof. Hence, to provide a frame of reference, a two dimensional X-,Y-coordinate system is shown which is coincident with the centroid of the cross-section. Furthermore, insofar as the teachings of the present invention are directed to the characteristic cross-sectional configuration of the structural member 10, reference to the monolithic structural member 10 and to its cross-sectional configuration will be used interchangeably.

As shown, the monolithic structural member 10 is subject to steady and vibratory shear loads V which produce steady and vibratory bending loads M about the X-axis of the reference coordinate system, hereinafter referred to as the "applied loads axis". The structural member 10 has at least one pair of structural ribs 14a, 14b wherein the base portions 16a, 16b thereof are integrally formed with a central connecting element 18. While the connecting element 18 is shown in combination with laterally protruding side elements 18a, 18b, the connecting element 18 is defined as the portion between and structurally interconnecting the ribs 14a, 14b, i.e., the portion disposed in combination with the base portions 16a, 16b. The structural ribs 14a, 14b project outwardly of the connecting element 18, e.g., at right angles to the applied loads axis X, and are disposed in the tensile field T (see FIG. 1b) produced by the steady and vibratory bending moment loads M. That is, the structural ribs 14a, 14b are disposed on the side of the applied loads axis X which place the structural ribs in tension as a result of the steady portion of the bending moment loads M. Such relative placement is meaningful inasmuch as fatigue cracks will tend to originate in areas of peak tensile stress and propagate in tensile stress regions i.e., as compared to compressive stress regions.

The structural ribs 14a, 14 are substantially parallel and are disposed equidistant from and proximal to the centroid $C_T$ of the cross-section 10. In the context used herein, "proximal to the centroid $C_T$ of the cross-section" is defined as the normal distance $D_N$ from the Y-axis to the interior surface of the structural rib 14a or 14b. This distance will preferably be as small as manufacturing criteria and/or techniques will allow. For example, manufacturing criteria employed at Sikorsky Aircraft Corp. dictate that the width of machined slots be at least ¼ of its total depth. This standard has been adopted based on the flexure of cutting wheels employed and the ability thereof to repetitively machine such slots within desired manufacturing tolerances. Accordingly, for the cited example, a structural rib 14a or 14b having a length dimension L of about 2.0 inches (5.1 cm) will necessitate a minimum spacing between the structural ribs 14a, 14b of at least 0.5 inches (1.27 cm) and, consequently, a normal distance $D_N$ of about ⅛ of the length dimension L, or about 0.25 inches (0.64 cm).

The inventors discovered that subtle changes in the spacing and location of the structural ribs 14a, 14b, and, consequently, to the section moments of inertia $I_X$, $I_Y$, can provide significant improvement with respect to retarding or arresting crack propagation in the structural member 10. More specifically, it was determined that crack propagation is suppressed when the ratio of moments of inertia $I_X/I_Y$ (hereinafter referred to as the inertia ratio) is maintained greater than or equal to 1.0 as a crack propagates in one of the structural ribs 14a, 14b. That is, as a crack propagates in one of the ribs 14a, the remaining structure must produce this inertia ratio $I_X/I_Y$, even as the crack propounds to alter the ratio. In the broadest sense of the invention, the calculated values of $I_X$ and $I_Y$ are based solely on contributions made by the structural ribs 14a, 14b in combination with the contribution of the central connecting element 18 (hereinafter referred to as the "partial inertia ratio"). To fully optimize the flaw tolerant properties of the structural member, the inertia ratio is preferably greater than or equal to 1.0 for the entire cross-section, i.e., including the contributions made by appending structure, e.g., the laterally protruding side elements 18a, 18b (hereinafter referred to as the "entire inertia ratio). The import of such partial and entire inertia ratios $I_X/I_Y$ is discussed in the succeeding paragraphs.

The partial/entire inertia ratio $I_X/I_Y$ may be viewed as a geometric description of the cross-sectional configuration which bears directly on the spatial position and/or orientation of the principle bending axes of the cross-section 10. The principle bending $X_P$, $Y_P$ are the axes about which the product of inertia $P_{xy}$ of the cross-sectional shape equals zero. Furthermore, the product of inertia $P_{xy}$ and the angular orientation θ of the principle axes $X_P$, $Y_P$ are defined by equations 1.0 and 2.0 below:

$$P_{xy} = \int xy\, dA \quad (1.0)$$

wherein x and y are the coordinates of each differential element of area relative to the two dimensional X-,Y-coordinate system, and dA is the area of the differential element; and $$\theta = \tfrac{1}{2} \tan^{-1}[2P_{xy}/(I_x - I_y)] \quad (2.0)$$

Equation 2.0 defines two angles which correspond to the principal moments of inertia, $I_{MAX}$, $I_{MIN}$ wherein one of the determined angles maximizes the moment of inertia $I_{MAX}$ and the other minimizes the moment of inertial $I_{MIN}$ about the principle axes $X_P$, $Y_P$.

Figure 2:
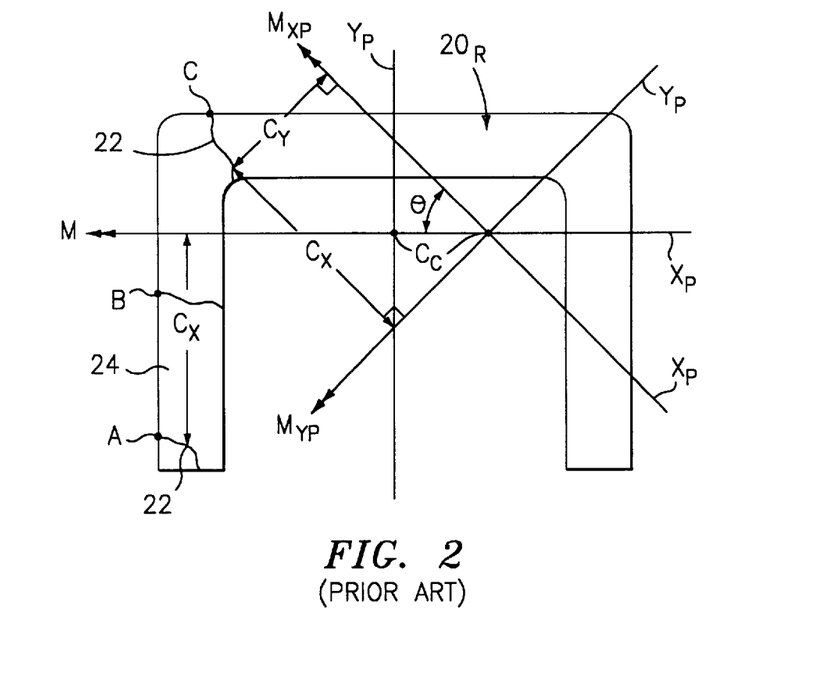
FIG. 2 is a characteristic cross-section through a conventional C-shaped structural member for the purpose of illustrating the propagation of a flaw or crack therein and the propensity of the C-shaped member to precipitate further crack propagation.
Figure 3:
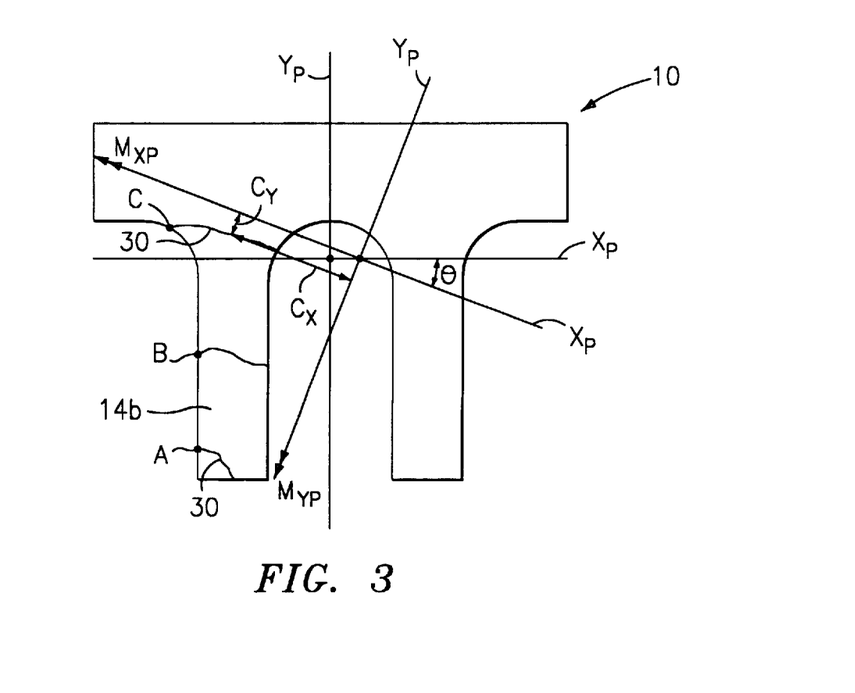
FIG. 3 is a characteristic cross-sectional view through the monolithic structural member for the purpose of illustrating the propagation of a flaw or crack therein and the propensity of the monolithic structural member to retard further crack propagation.

To gain a better appreciation for the relationship between the rib spacing/location, the spatial position of the principle axes, and crack propagation, reference is made to FIGS. 2 and 3, wherein a comparison is made between a conventional C-shaped cross-sectional configuration 20 and the cross-sectional configuration 10 of the present invention. In FIG. 2, a flaw or crack 22 is shown originating at point A in one of the ribs 24 of the C-shaped section and propagating to points B and C thereof upon being subject to multiple cyclic loading, i.e., vibratory bending loads M about the applied loads axis X. The crack 22 may be viewed as a physical separation of the C-section wherein, at point C, the remaining structure $20_R$ is generally L-shaped. Initially, the principle axes, $X_P$, $Y_P$ are horizontal and vertical due to the symmetry of the cross-section. As the crack propagates, the principle axes $X_P$, $Y_P$ of the structure 20 rotates through an angle θ and is spatially repositioned as the centroid $C_c$ shifts due to the loss of the structural rib 24 and, consequently, to the loss of cross-sectional symmetry. Even though the applied loads axis X remains rotationally fixed, the loss of symmetry induces moments $M_{XP}$, $M_{YP}$ about the principle axes $X_P$, $Y_P$ due to a structures inherent requirement to produce stress equilibrium therein.

The rotation and spatial repositioning of the principle axes $X_P$, $Y_P$ precipitates propagation of the crack 22 insofar as the stress intensity at any point A, B, or C, remains high. As used herein, stress intensity defines the propensity for a crack to propagate in a structure and is a function of $M_{XP}C_y/I_X + M_{YP}C_x/I_Y$ wherein $c_x$, $c_y$ is the separation distance measured from the principle axes $X_P$, $Y_P$ to the crack 22, and $I_X$, and $I_Y$ are the moments of inertia of the structure (or remaining structure) about the principle axis $X_P$, and $Y_P$, respectively. It will be appreciated by examining the change in principle axis location that the stress intensity at each crack propagation point A, B or C remains high insofar as such points A, B, C are distally spaced from the principle axes $X_P$, $Y_P$.

In FIG. 3, a crack propagation scenario analogous to that described above is depicted for the exemplary double-tee cross-sectional configuration 10 of the present invention. The structural ribs 14a, 14b are disposed equidistant from and proximal to the centroid $C_T$ and, when examined in combination with the connecting element 18, produce a partial inertia ratio $I_X/I_Y$ which is greater than or equal to 1.0. As shown, a flaw or crack 30 propagates in one of the structural ribs 14a, i.e., from points A to C, wherein point C corresponds to the base portion 16a of the structural rib 14a. The partial inertia ratio defined by the structural ribs 14a, 14b and the connecting element 18 causes the principle axes $X_P$, $Y_P$ to rotate through a small angle θ as the crack 30 propagates. Preferably, the angular rotation is less than about 35 degrees, and more preferably, less than about 25 degrees. It will be appreciated that the distance $c_X$, $c_Y$ from the crack 30 to the principle axes $X_P$, $Y_P$ decreases as the crack propagates in the structural rib 14a. Consequently, it may be stated that the crack propagates into a region of reducing stress intensity and the rate of crack growth will be reduced or arrested.

Figure 4:
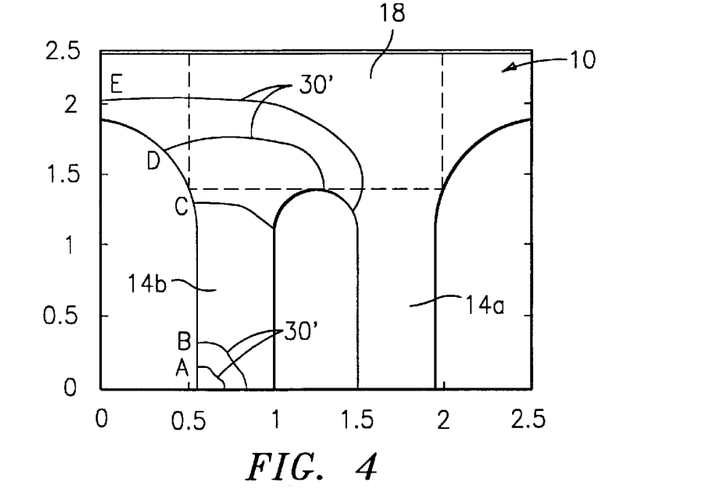
FIG. 4 depicts a characteristic cross-sectional view of a fatigue test specimen which employs the teachings of the present invention.

To verify the crack arresting properties of such monolithic structural member 10, several test specimens having an initial formed crack in one of the structural ribs were fatigue loaded in four point bending. Referring to FIG. 4, one of the test specimens is shown wherein the structural ribs 14a, 14b thereof were disposed proximal to the section centroid and wherein the partial inertia ratio $I_X/I_Y$ produced by the combination of ribs 14a, 14b, and central connecting element 18 was approximately 1.6. The test specimen was fabricated from a homogeneous Polymethylmethacrylate (PMMA) material and was 12 inches in length, 2.486 in height, and 2.5 inches in width. Furthermore, the structural ribs 14a, 14b were each about 1.35 inches (3.43 cm) in length, about 0.44 inches (1.12 cm) in thickness and separated by a distance of about 0.5 inches (1.27 cm). The specimen was exposed to a maximum shear force V of 740 lbs, which produced a maximum moment M of 2,960 lbs-in. Under loading, an initial corner flaw or crack 30' at point A' propagated to point B' after 59,973 cycles. The crack 30' quickly propagated to point C' after an additional 31 cycles but slowed considerably thereafter. More specifically, the crack propagated to point D' after 105,882 cycles and was effectively arrested at point E' after 308,664 cycles. Fatigue tests were conducted on 4 additional specimens which all exhibited similar crack propagation properties. The results of the specimen testing indicate that such cross-sectional configuration 10 provides an effective mechanism for retarding the growth of cracks which initiate in one of the structural ribs. Although conditions for arresting crack propagation will vary depending upon the actual loads applied to the structural member, the advantageous fatigue crack growth properties thereof were clearly demonstrated in these fatigue tests.

While many of the design methodology guidelines have been previously addressed, the following summarizes these and other guidelines for producing flaw tolerant structures. For emphasis, each guideline is discussed separately, however, it should be understood that the guidelines are interrelated and must be iteratively examined for the purposes of optimization. Firstly, the structural ribs 14a, 14b should be disposed in the tensile field T produced by the bending moments M about the applied loads axis X. As mentioned earlier, such placement is meaningful insofar as crack propagation is most commonly associated with tensile loading. Preferably, the structural ribs 14a, 14b should react the entirety of the applied tensile loads. With regard to the latter, it is preferable to cause the centriod $C_T$ of the cross-section to fall beyond the bounds defined by the central connecting element 18 such that tensile loads are principally reacted by the structural ribs 14a, 14b. This may be accomplished by elongating the ribs 14a, 14b, i.e., increasing $I_X$, such that centroid $C_T$ is shifted to a location between the structural ribs 14a, 14b and beyond the central connecting element 18. Such placement of the centroid $C_T$ inhibits penetration of a crack into the region defined by the central connecting element 18 and, consequently, the ultimate failure of the structural member 10. Secondly, the structural ribs 14a, 14b are preferably separated along the entire rib-stiffening portion Rs of the cross-section (see FIG. 1b). In the context used herein the "rib-stiffening portion" is that portion of the structural member 10 which substantively contributes to the bending stiffness of the structure, i.e., about the applied loads axis X, and preferably at least about 20% of the bending stiffness. Consequently, a crack propagating in one of the structural ribs 14a or 14b will travel to the respective base portion 16a or 16b thereof without influencing the contribution of bending stiffness provided by the remaining structural rib 14a or 14b. Thirdly, the structural ribs 14a, 14b should be as close as practicable to the centroid $C_T$ of the cross-section such that the contribution to the Y-axis moment of inertia $I_Y$ is small as compared to the contribution to the X-axis moment of inertia $I_X$. The partial inertia ratio $I_X/I_Y$ of the combined structural ribs and connecting element should be maintained greater than or equal to about 1.0 such that the rotation and/or change in spatial position of the principle bending axes is minimized. Optimally, the entire inertia ratio $I_X/I_Y$ of the cross-sectional shape should be greater than 1.0.

Figure 5A:
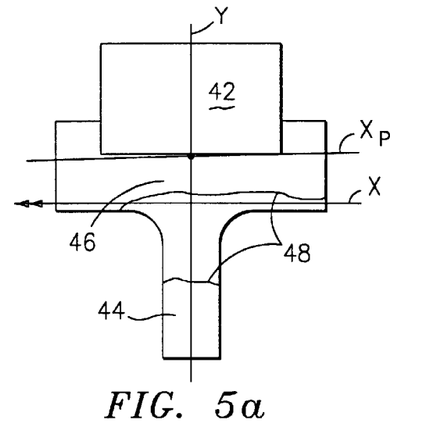
FIG. 5a depicts a base cross-sectional member having a generally Y-shaped cross-section.

While the above describes the guidelines or rules which should be followed for producing flaw tolerant structures, the following describes the steps for designing a structural member which (i) meets the requisite structural requirements and (ii) produces a flaw tolerant structure. The design of a structure is typically dictated by strength and weight requirements, envelop constraints and interface requirements for attaching the structural member to mating components. For example, FIG. 5a shows a conventional Y-shaped structural member 40 which has been designed for strength, required stiffness about the applied loads axis X, and for mateably engaging an adjacent component 42. The stiffening member 44 and a portion of the central web 46 is disposed in the tensile field about an applied loads axis X, however, as shown, the Y-shaped structure 40 has not been designed for flaw tolerance. A crack 48 originating in the stiffening member 44 will propagate into the central web 46, and furthermore, cause the centroid $C_Y$ and principle axes $P_X$ to shift vertically. Consequently, a greater portion of the central web 46 is exposed to tensile loading such that the crack 48 may penetrate further and potentially sever the Y-shaped section.

Figure 5B:
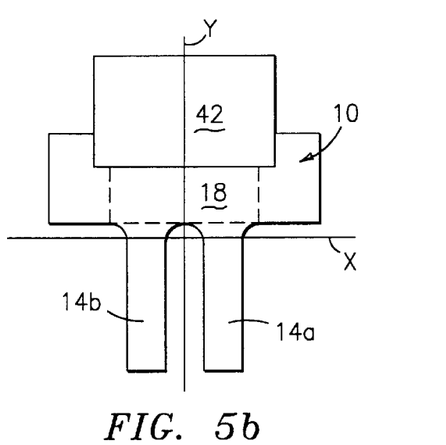
FIG. 5b depicts a modified Y-shaped cross-sectional member which is optimized in accordance with the teachings of the present invention.

In FIG. 5b the stiffening member has been reconfigured using the above described guidelines to provide improved flaw tolerance. More specifically, the stiffening member is reconfigured to form at least two structural ribs 14a, 14b such that the partial inertia ratio $I_X/I_Y$ of the combined structural ribs 14a, 14b and the central connecting element 18 is greater than or equal to 1.0. With respect to the reconfigured cross-section 10, the entire inertia ratio may be less than 1.0, however, when reconfiguring the base cross-sectional structure 40, i.e., it is necessary to ensure that the entire inertia ratio $I_X/I_Y$ remains at least constant and preferably increases. This may be accomplished by elongating the structural ribs 14a, 14b in the Y-axis direction (increasing $I_X$) to compensate for the increased contribution to $I_Y$ due to the separation of the structural ribs 14a, 14b in the X-axis direction (albeit small). By maintaining or increasing the entire inertia ratio $I_X/I_Y$ flaw tolerance will be improved even though the entire inertia ratio $I_X/I_Y$ may be below the optimum ratio of 1.0 or more.

In summary, the design of such flaw tolerant structures involves defining a base cross-sectional configuration 40, which meets predefined structural and functional requirements, e.g., stress allowables, attachment requirements etc. and reconfiguring the base cross-sectional configuration 40 to form a modified cross-sectional configuration having at least one pair of structural ribs which (i) produce a partial inertia ratio $I_X/I_Y$, of at least 1.0 and (ii) maintain or increase the entire inertia ratio $I_X/I_Y$ corresponding to the entire cross-section from the entire inertia ratio $I_X/I_Y$ defined by the base cross-sectional configuration, or, preferably, (iii) produce an entire inertia ratio of 1.0 or more.

As discussed in the Background of the Invention, prior art methods for imparting flaw tolerance to a structural member involve structural augmentation, the use of fiber-reinforced composite materials, or multi-element construction. The disadvantages thereof include structural inefficiencies, weight penalties, costly fabrication techniques and intricate assembly. The teachings of the present invention yield a monolithic structural member 10 which is flaw tolerant without incurring weight penalties associated with structural augmentation. Furthermore, the monolithic structural member 10 may be fabricated using homogeneous materials, i.e., metals or plastics, and conventional manufacturing techniques such as machining, milling or casting. It will be appreciated that such fabrication techniques involve single step forming operations, e.g., machining, which may be automated and, consequently, are less costly than the multi-stage, hands-on, forming operations typically required for composite structures. Finally, the structural member 10 produces a unitary structure requiring no secondary or redundant structural elements to act in a redundant load-carrying capacity. That is, the structural member 10 provides the necessary flaw tolerance without the added weight and complexity associated with multi-element construction.

Figure 5C:
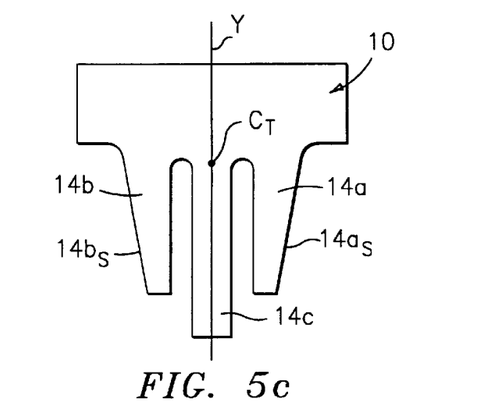
FIG. 5c depicts a structural member in accordance with the present invention for illustrating various alternate embodiments thereof.

While the structural member has been shown and described in terms of a pair of structural ribs, it will be appreciated that several ribs may be employed. FIG. 5c shows a structural member 10 having three (3) structural ribs 14a, 14b and 14c wherein the ribs 14a–14c are disposed proximal to the centroid $C_T$ of the section 10. Furthermore, while two structural ribs 14a, 14b are equidistant from the centriod $C_T$, the central rib 14c coincides with the Y-axis, and, accordingly, is not "equidistantly spaced" as described in earlier embodiments. Moreover, while the earlier described embodiments depict structural ribs 14a, 14b which are substantially parallel, i.e., having parallel side surfaces, it will be appreciated that the surfaces $14a_s$, $14b_s$ may be inclined or canted with respect to each other.

Application to a Helicopter Rotor Hub Assembly

The monolithic structural member described herein is useful in any application wherein flaw tolerance is desirable. One such application is described below pertaining to an articulated rotor hub assembly wherein certain structural components or segments thereof employ a monolithic structural member, i.e., cross-sectional configuration, in accordance with the teachings described hereinabove. The structural components or segments thereof which benefit from the cross-sectional configuration are those which are exposed to high steady and vibratory bending moment loads. When describing the cross-sectional configuration of the structural components or segments thereof, it will facilitate the discussion to use the same reference numbers identified earlier when describing the more generic cross-sectional configuration according to the present invention.

Figure 6A:
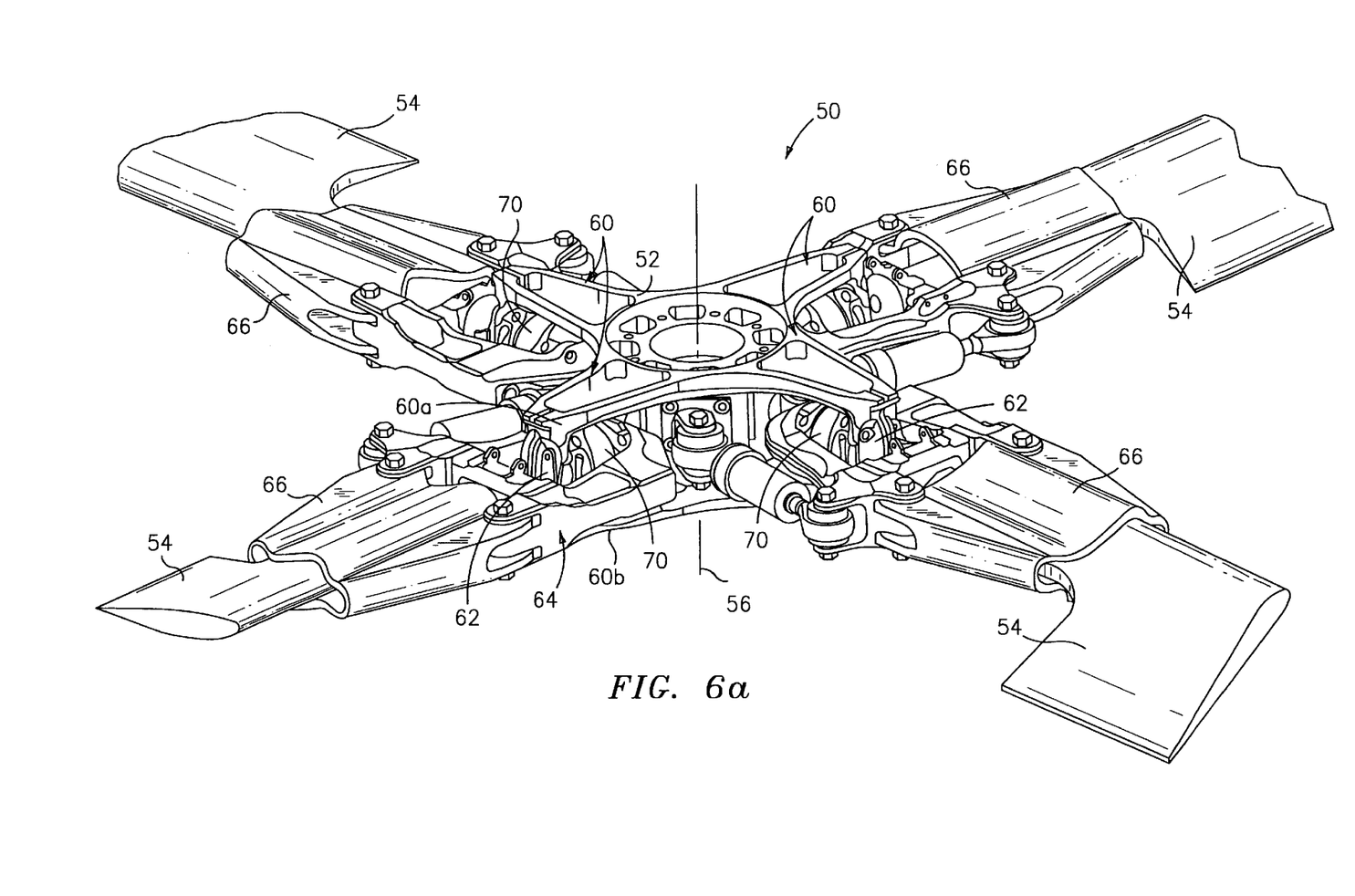
FIGS. 6a and 6b, depict a perspective view of an articulated rotor hub assembly (FIG. 6a) and an isolated view of a rotor assembly yoke and shear segment combination (FIG. 6b), respectively, wherein the rotor assembly yoke and shear segment employ a monolithic structural member according to the teachings of the present invention.

In FIG. 6a, a rotor hub assembly 50 is shown including a hub retention member 52 operative for driving a plurality of rotor blade assemblies 54 about an axis of rotation 56. The hub retention member 52 includes a plurality of radial spokes 60 and shear segments 62 which structurally interconnect pairs of radial spokes, i.e., upper and lower radial spokes, 60a, and 60b, respectively. Each shear segment 62, in combination with its respective radial spokes 60, form a structural loop for accepting a rotor assembly yoke 64. The rotor assembly yoke 64 is generally C-shaped and circumscribes, in looped fashion, the respective shear segment 62. More specifically, and referring to FIGS. 6a and 6b, the rotor assembly yoke 64 includes a midsection 64m, which extends through the respective structural loop, and a pair of radial arms 64a, 64b which project outwardly of the midsection 64m and to either side of the shear segments 62. The radial arms 64a, 64b are disposed in combination with the root end of the rotor blade assemblies 54 by means of an intermediate cuff assembly 66 (FIG. 6a).

Interposed between the midsection 64m of the yoke 64 and the respective shear segment 62 is an axisymmetric elastomeric bearing assembly 70 (not shown in FIG. 6b) which accommodates multi-directional displacement of the respective rotor blade assembly 54. Furthermore, the axisymmetric elastomeric bearing assembly 70 reacts the loads of the rotor blade assembly 54 so as to produce resultant steady and vibratory load vectors V which produce steady and vibratory bending moment loads M on the midsection 64m of the rotor assembly yoke 64 and the respective shear segment 62. Such elastomeric bearing assembly 70 is more fully described in commonly owned, co-pending patent application, Ser. No. 08/617,458, entitled "Axisymmetric Elastomeric Bearing Assembly for Helicopter Rotors".

Figures 6B, 6C, 6D:
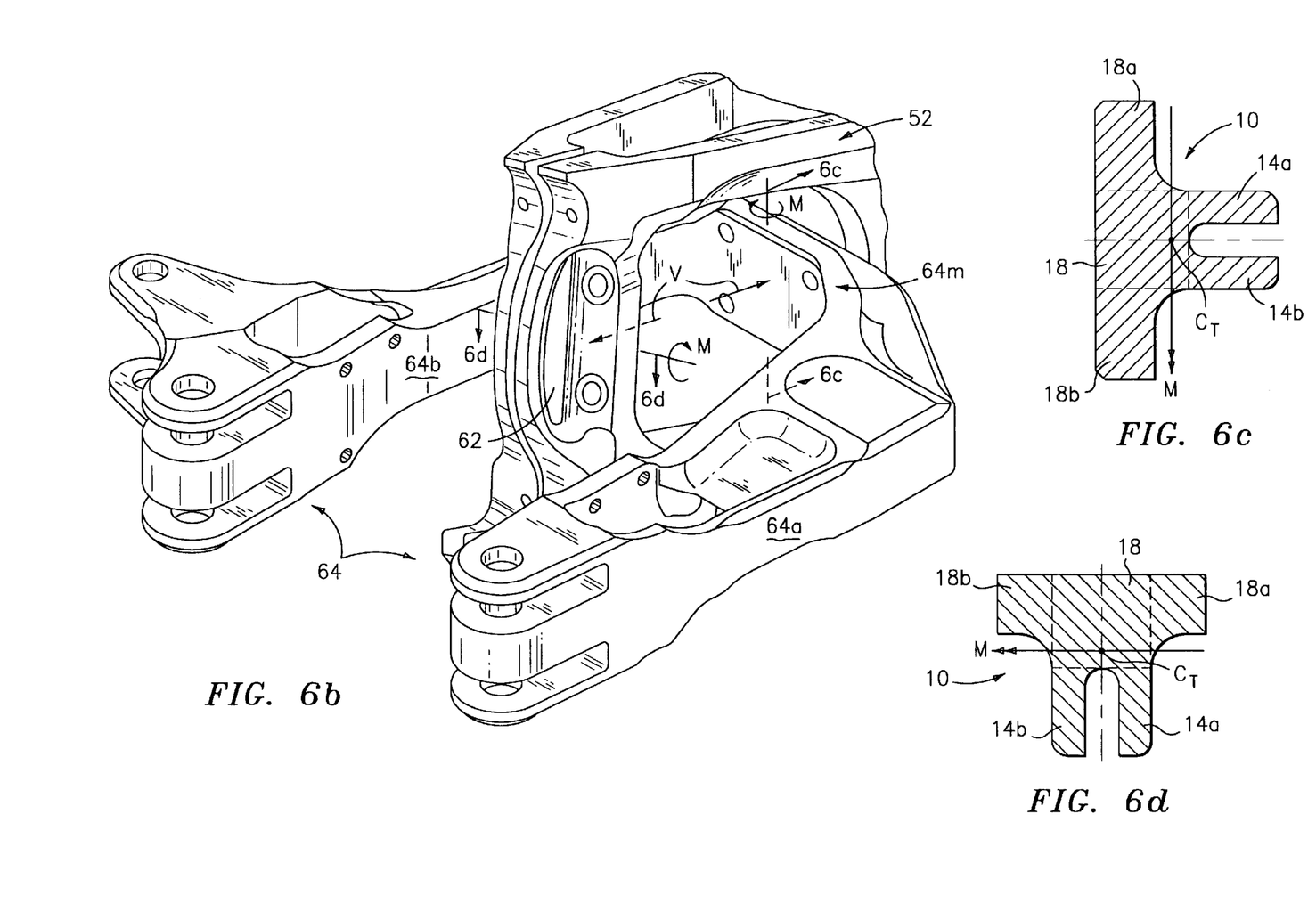
FIGS. 6c and 6d depict cross-sectional views taken along lines 6c—6c and 6d—6d, respectively, of FIG. 6b wherein the midsection of the rotor assembly yoke and the respective shear segment each have a generally double-tee cross-sectional configuration.

In FIGS. 6c and 6d, the cross-sectional configuration 10 of the midsection 64m of the rotor assembly yoke 64 and the respective shear segment 62 is configured so as to form a double-tee cross-sectional shape. The double-tee cross-sectional shape is characterized by structural ribs 14a, 14b projecting outwardly of a central connecting element 18 which includes laterally protruding side elements 18a, 18b. In accordance with the earlier described teachings, the structural ribs 14a, 14b are disposed in the tensile field produced by the steady and vibratory bending moment loads M. Furthermore, the structural ribs 14a, 14b are equidistant from and proximal to the centroid $C_T$ of the double-tee cross-section 10. Moreover, the double-tee cross-sectional configuration 10 is characterized by a partial inertia ratio which is greater than or equal to 1.0 and, for the described embodiment, is about 8.0.

As discussed hereinabove, the specific configuration of the double-tee cross-section provides improved flaw tolerance by retarding fatigue crack propagation. Insofar as the rotor assembly yokes 64 and shear segments 62 are highly loaded in vibratory bending and are susceptible to fatigue crack propagation, such cross-sectional configuration is particularly well-suited for such application. Moreover, fatigue tests indicate that when employing the double-tee cross-section 10, the rotor assembly yoke 64 and hub retention member 52 may be rated for unlimited life.

The rotor assembly yoke 64 and shear segment 62 are, preferably, contructed from metal stock, e.g., aluminum or titanium, wherein the desired double-tee cross-sectional configuration 10 may be formed via conventional machining, milling or casting techniques. Such construction and manufacturing methods are comparatively low-cost relative to composite-formed yokes and/or hub retention members of the prior art.

Figure 7A:
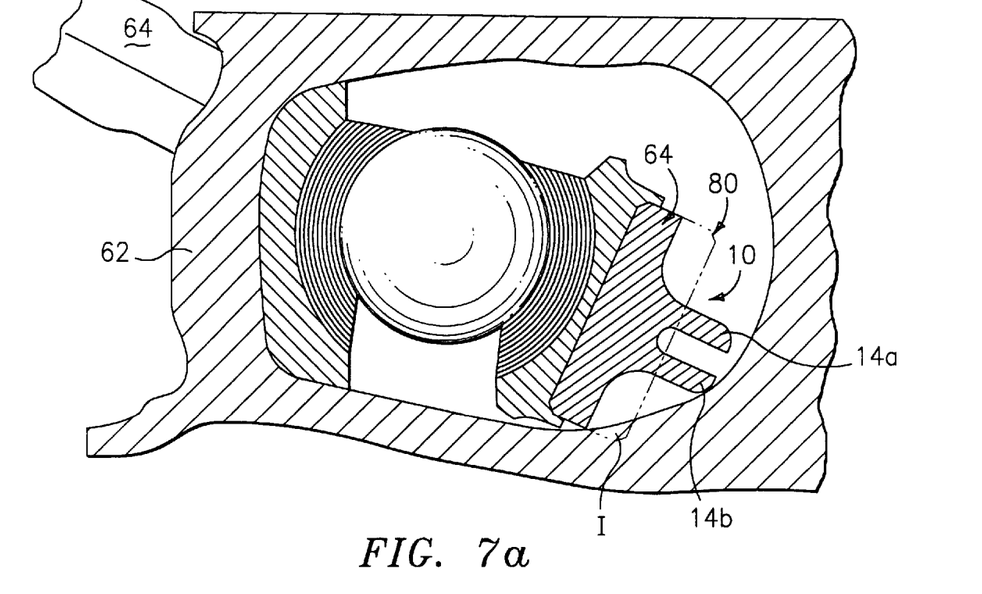
FIGS. 7a and 7b depict schematic side and top views of the rotor assembly yoke and respective shear segment wherein the double-tee cross-sectional configuration provides improved clearance between upper and lower radial spokes of the rotor hub assembly and the rotor assembly yoke (FIG. 7a) and between a radial arm of the rotor assembly yoke and the respective shear segment (FIG. 7b).
Figure 7B:
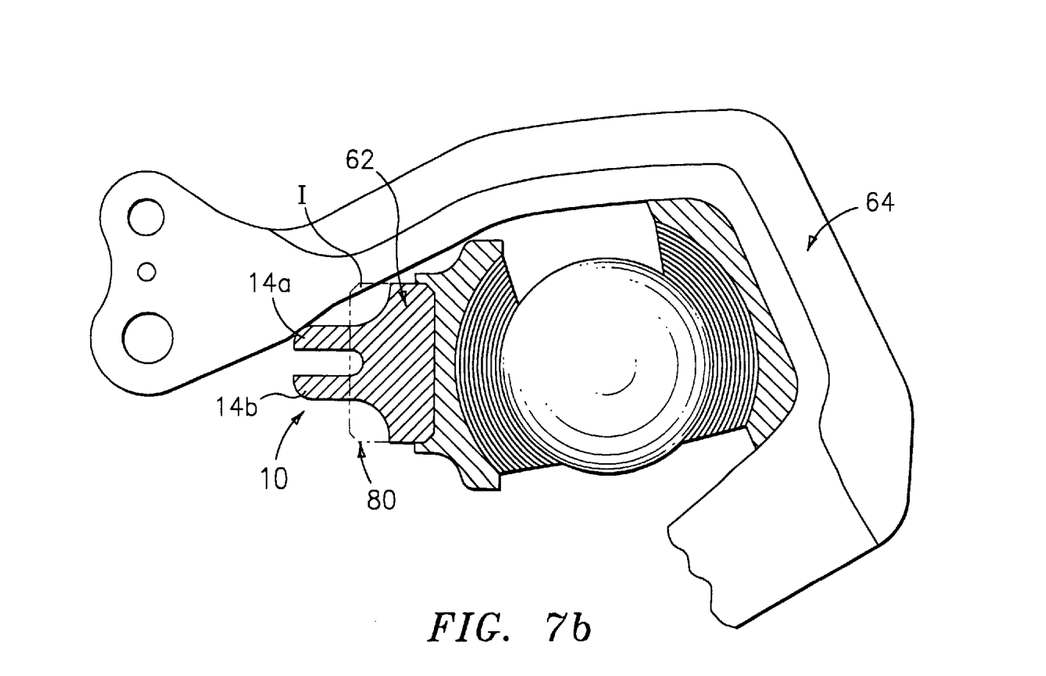

In addition to the flaw tolerant and fabrication advantages described above, the cross-sectional configuration 10 provides improved clearance between the rotor assembly yoke 64 and the radial spokes of the hub retention member and/or between the shear segment 62 and the radial arms 64a, 64b of the rotor assembly yoke. Such increased clearance provides greater design flexibility and/or enables the rotor hub assembly to be dimensionally smaller, hence lighter and more aerodynamically efficient. This feature is shown schematically in FIGS. 7a and 7b wherein the yoke 64 is shown in highly displaced conditions so as to be in close proximity to the adjacent rotor hub assembly components. In FIG. 7a, a side view of the yoke 64 and shear segment 62 is depicted wherein will be appreciated that the double-tee cross-sectional configuration 10, and more specifically the close spacing of the structural ribs facilitates higher angular excursions (flapwise) of the rotor assembly yoke when compared to a conventional rectangular cross-sectional shape, shown in phantom. The region I shows the interference which would typically limit the angular displacement of the rotor assembly yoke 64 and which is now obviated by the double tee cross-sectional configuration 10 of the present invention. Similarly, in FIG. 7b, a top view through the shear segment is shown wherein the double-tee cross-sectional configuration enables greater edgewise angular displacement when compared to a conventional C-shaped cross-sectional configuration 80, shown in phantom.

Although the invention has been shown and described with respect to exemplary embodiments thereof, it should be understood by those skilled in the art that the foregoing and other changes, omissions and additions may be made therein and thereto, without departing from the spirit and scope of the present invention.

What is claimed is:

1. A structural member (10) having improved flaw tolerant properties and operative for reacting steady and vibratory bending moment loads M about an applied loads axis X, the structural member (10) being characterized by:

a monolithic structure having a characteristic cross-sectional configuration (10) defining a section centroid $C_T$, said cross-sectional configuration (10) further including:

a central connecting element (18); and at least one pair of structural ribs (14a, 14b) being integrally formed with said central connecting element (18) and projecting outwardly thereof, said structural ribs (14a, 14b) being disposed in the tensile field produced by the steady portion of said bending moment loads M and being proximal to said section centroid $C_T$;

said central connecting element (18) and said structural ribs (14a, 14b) producing a partial inertia ratio $I_X/I_Y$ wherein said partial inertia ratio $I_X/I_Y$ is greater than or equal to 1.0.

2. The structural member (10) according to claim 1 wherein said central connecting element (18) includes laterally protruding side elements (18a, 18b) and wherein said connecting element (18) in combination with said structural ribs (14a, 14b) form a double-tee cross-sectional shape.

3. The structural member (10) according to claim 1 wherein said structural ribs (14a, 14b) are equidistant from said section centroid $C_T$.

4. The structural member (10) according to claim 1 wherein said structural ribs (14a, 14b) are parallel.

5. The structural member (10) according to claim 2 wherein said double-tee shaped cross-sectional shape defines an entire inertia ratio $I_X/I_Y$, said entire inertia $I_X/I_Y$ ratio being greater than or equal to 1.0.

6. The structural member (10) according to claim 2 wherein said cross-sectional configuration (10) defines a rib-stiffening portion $R_s$, and wherein said structural ribs (14a, 14b) are separated along said entire rib-stiffening portion $R_s$.

7. The structural member (10) according to claim 2 wherein said structural ribs (14a, 14b) define a length dimension L and wherein each of said structural ribs (14a, 14b) define normal distance $D_N$ from said centroid $C_T$, said normal distance $D_N$ being about ⅛ of said length dimension L.

8. The structural member (10) according to claim 2 wherein said monolithic structure is formed from a homogeneous material.

9. A rotor assembly yoke (64) for use in combination with a hub retention member (52) of an articulated rotor hub assembly (50), the rotor assembly yoke (64) including a midsection (64m) and a pair of radially extending arms (64a, 64b) projecting therefrom, said midsection (64m) being operative for reacting steady and vibratory bending moment loads M about an applied loads axis X and furthermore being configured to provide improved flaw tolerance and improved clearance between the rotor assembly yoke (64) and the radial spokes (60a, 60b) of the hub retention member (52), said midsection (64m) of said rotor assembly yoke (64) being characterized by:

a monolithic structure having a double-tee cross-sectional configuration (10), said double-tee cross-sectional configuration (10) defining a section centroid $C_T$, and further including:

a central connecting element (18);

side elements (18a, 18b) protruding laterally of said central connecting element (18); and at least one pair of structural ribs (14a, 14b) being integrally formed with said central connecting element (18) and projecting outwardly thereof, said structural ribs (14a, 14b) being disposed in the tensile field produced by the steady portion of said bending moment loads M and being proximal to said section centroid $C_T$;

said central connecting element (18) and said structural ribs (14a, 14b) producing a partial inertia ratio $I_X/I_Y$ wherein said inertia ratio $I_X/I_Y$ is greater than or equal to 1.0.

10. The rotor assembly yoke (64) according to claim 9 wherein said structural ribs (14a, 14b) are equidistant from said section centroid $C_T$.

11. The rotor assembly yoke (64) according to claim 9 wherein said structural ribs (14a, 14b) are parallel.

12. The rotor assembly yoke (64) according to claim 9 wherein said cross-sectional configuration (10) defines a rib-stiffening portion $R_s$, and wherein said structural ribs (14a, 14b) are separated along said entire rib-stiffening portion $R_s$.

13. The rotor assembly yoke (64) according to claim 9 wherein said structural ribs (14a, 14b) define a length dimension L and wherein each of said structural ribs (14a, 14b) define normal distance $D_N$ from said centroid $C_T$, said normal distance $D_N$ being about ⅛ of said length dimension L.

14. The rotor assembly yoke (64) according to claim 9 wherein said monolithic structure is formed from a homogeneous material.

15. The rotor assembly yoke (64) according to claim 14 wherein said partial inertia ratio is about 8.0.

16. A hub retention member (52) for use in combination with a rotor assembly yoke (64) of a rotor hub assembly (50), the hub retention member including a shear segment (62) operative for reacting steady and vibratory bending moment loads M about an applied loads axis X, said shear segment (62) being configured to provide improved flaw tolerance and improved clearance between the hub retention member (52) and the rotor assembly yoke (64) and, further, characterized by:

a monolithic structure having a double-tee cross-sectional configuration (10), said double-tee cross-sectional configuration (10) defining a section centroid $C_T$, and further including:

a central connecting element (18) having laterally protruding side elements (18a, 18b); and at least one pair of structural ribs (14a, 14b) being integrally formed with said central connecting element (18) and projecting outwardly thereof, said structural ribs (14a, 14b) being disposed in the tensile field produced by the steady portion of said bending moment loads M and being proximal to said section centroid $C_T$;

said central connecting element (18) and said structural ribs (14a, 14b) producing a partial inertia ratio $I_X/I_Y$ wherein said partial inertia ratio $I_X/I_Y$ is greater than or equal to 1.0.

17. The hub retention member (52) according to claim 16 wherein said structural ribs (14a, 14b) are equidistant from said section centroid $C_T$.

18. The hub retention member (52) according to claim 16 wherein said structural ribs (14a, 14b) are parallel.

19. The hub retention member (52) according to claim 16 wherein said cross-sectional configuration (10) defines a rib-stiffening portion $R_s$, and wherein said structural ribs (14a, 14b) are separated along said entire rib-stiffening portion $R_s$.

20. The hub retention member (52) according to claim 16 wherein said structural ribs (14a, 14b) define a length dimension L and wherein each of said structural ribs (14a, 14b) define normal distance $D_N$ from said centroid $C_T$, said normal distance $D_N$ being about ⅛ of said length dimension L.

21. The hub retention member (52) according to claim 16 wherein said monolithic structure is formed from a homogeneous material.

22. The hub retention member (52) according to claim 21 wherein said partial inertia ratio is about 8.0.

23. A method for forming a flaw tolerant structural member (10) which is operative for reacting steady and vibratory bending moment loads M about an applied loads axis X, the method being characterized by the steps of:

defining a monolithic structural member having a base cross-sectional configuration (40) which meets predefined structural and functional requirements, said monolithic structure member defining an entire inertia ratio $I_X/I_Y$; and reconfiguring the base cross-sectional configuration (40) to form a modified cross-sectional configuration (10) having at least one pair of structural ribs (14a, 14b) which project outwardly from a central connecting element (18) of said base cross-sectional configuration (40), said structural ribs (14a, 14b) being disposed in the tensile field produced by the steady portion of said bending moment loads M, said structural ribs (14a, 14b), furthermore, being are proximal to said section centroid $C_T$;

said modified cross-sectional configuration (10) defining an entire inertia ratio $I_X/I_Y$, said entire inertia ratio being equal to or greater than said entire inertia ratio $I_X/I_Y$ of said base cross-sectional configuration (40).

* * * * *